(12) United States Patent
Nakamura et al.

(10) Patent No.: US 7,303,223 B2
(45) Date of Patent: Dec. 4, 2007

(54) POWER SEAT SLIDE DEVICE FOR VEHICLE

(75) Inventors: Yoshitaka Nakamura, Toyota (JP); Toshihiro Kimura, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 50 days.

(21) Appl. No.: 11/397,849

(22) Filed: Apr. 5, 2006

(65) Prior Publication Data

US 2006/0237987 A1 Oct. 26, 2006

(30) Foreign Application Priority Data

Apr. 22, 2005 (JP) ............... 2005-125659

(51) Int. Cl.
*B60N 2/02* (2006.01)
(52) U.S. Cl. ............... 296/65.15; 296/65.13; 248/429
(58) Field of Classification Search ............ 296/65.15, 296/65.14, 65.13; 248/429, 430
See application file for complete search history.

(56) References Cited

U.S. PATENT DOCUMENTS

| 5,259,257 | A | * | 11/1993 | Mouri | ............... 248/429 |
|---|---|---|---|---|---|
| 5,829,727 | A | * | 11/1998 | Chinomi et al. | ............ 248/429 |
| 5,931,436 | A | * | 8/1999 | Rohee | ............... 248/430 |
| 5,961,089 | A | * | 10/1999 | Soisnard | ............ 296/65.14 |
| 6,079,688 | A | * | 6/2000 | Levillain et al. | ............ 248/429 |
| 6,113,051 | A | * | 9/2000 | Moradell et al. | ............ 248/430 |
| 6,126,133 | A | * | 10/2000 | Timon et al. | ............... 248/429 |
| 6,138,974 | A | * | 10/2000 | Okada et al. | ............... 248/429 |
| 6,220,642 | B1 | * | 4/2001 | Ito et al. | ............... 296/65.14 |
| 6,244,660 | B1 | * | 6/2001 | Yoshimatsu | ............... 248/429 |
| 6,676,099 | B2 | * | 1/2004 | Mallard et al. | ............... 248/429 |
| 6,688,574 | B2 | * | 2/2004 | Okazaki et al. | ............... 248/429 |
| 6,742,753 | B2 | * | 6/2004 | Klahold et al. | ............... 248/429 |
| 6,767,029 | B2 | * | 7/2004 | Jaudouin et al. | ......... 296/65.13 |
| 6,971,620 | B2 | * | 12/2005 | Moradell et al. | ........... 248/422 |
| 2003/0141737 | A1 | * | 7/2003 | Nishimoto et al. | ...... 296/65.15 |
| 2004/0056165 | A1 | * | 3/2004 | Ganot | ............... 248/430 |
| 2004/0108762 | A1 | * | 6/2004 | Borbe et al. | ............... 248/429 |
| 2004/0178316 | A1 | * | 9/2004 | Rohee | ............... 248/429 |
| 2006/0186687 | A1 | * | 8/2006 | Kimura et al. | ........... 296/65.13 |
| 2006/0289717 | A1 | * | 12/2006 | Ito | ............... 248/419 |

FOREIGN PATENT DOCUMENTS

| JP | 2001-239861 | 9/2001 |
|---|---|---|
| JP | 2002-192996 | 7/2002 |

* cited by examiner

*Primary Examiner*—Kiran B. Patel
(74) *Attorney, Agent, or Firm*—Buchanan Ingersoll & Rooney PC

(57) ABSTRACT

A power seat slide device for a vehicle includes a first rail fixed on a vehicle floor, a second rail fixed at a vehicle seat, a first rolling body, a second rolling body, a screw shaft having a shaft center, a gear box including a gear housing and a supporting bracket and a plate, the supporting bracket including a main unit portion and extending portions, the main unit portion engaging with a top end surface of each of the second side wall portions and a top end surface of the cover portion and each of extending portions extends outward in a width direction thereof from the main unit portion and engaging with a top end surface of the base end portion of each of the second folded wall portions.

10 Claims, 5 Drawing Sheets

US 7,303,223 B2

POWER SEAT SLIDE DEVICE FOR VEHICLE

CROSS REFERENCE TO RELATED APPLICATIONS

This application is based on and claims priority under 35 U.S.C. §119 to Japanese Patent Application 2005-125659, filed on Apr. 22, 2005, the entire content of which is incorporated herein by reference.

FIELD OF THE INVENTION

The present invention relates to a power seat slide device for a vehicle.

BACKGROUND

As disclosed in 2001-239861A and 2002-192996A, various types of power seat slide devices for a vehicle, which adjust a position of a vehicle seat relative to the vehicle floor by moving an upper rail so as to slide relative to the lower rail by means of power generated by an electric driving source, has been proposed. FIG. 5 illustrates a longitudinal sectional view indicating an example of the power seat slide device for a vehicle. As shown in FIG. 5, the power seat slide device includes a lower rail 81, an upper rail 82, a nut member 83, a screw shaft 84 and a gear box 85. Specifically, the lower rail 81 is fixed to the vehicle floor, and the upper rail 82 supports the vehicle seat in a manner where it is supported by the lower rail 81 so as to be slidable. The nut member 83 is fixed to the lower rail 81, the screw shaft 84 is screwed into the nut member 83, and the gear box 85 is fixed to the upper rail 82 at a front end thereof in order to transmit rotations generated by the electric driving source.

The gear box 85 includes a gear housing 86 made of resin, a supporting bracket 87 and a plate 88, which are made of metal plates in order to hold the gear housing 86. In a gear housing 86 of the gear box 85, a worm 91, which is provided at the electric driving source, and a helical gear (worm wheel) 92, which is made of resin and fixed to a top end portion of the screw shaft 84 so as to mesh with worm 91, are housed.

The helical gear 92 is fixed to the screw shaft 84 within the gear box 85 in a manner where it is sandwiched between a washer 93 and a nut 94. The washer 93 is made of metal so as to engage with the screw shaft 84, and the nut 94 is fastened to the bolt portion 84a of the screw shaft 84, which is provided so as to penetrate through the gear box 85.

The gear box 85 is fixed to the upper rail 82 in a manner where a supporting bracket 87 engages with a front end surface of the upper rail 82, and plural attachment portion 87a of the supporting bracket 87 are fixed to the upper rail 82 by means of rivet 95. The attachment portions 87a are formed so as to extend in the side of the upper rail 82, and only one attachment portion 87a is illustrated in FIG. 5.

In this configuration, when the screw shaft 84, to which the helical gear 92 is provided, is rotated by rotating the worm 91 by means of the electric driving source, the screw shaft 84 is moved in an axial direction thereof relative to the nut member 83 fixed to the lower rail 81, as a result, the upper rail 82 slides relative to the lower rail 81 so that the position of the vehicle seat relative to the vehicle floor F is adjusted.

A condition where the upper rail 82 is supported by the lower rail 81 will be explained in accordance with FIG. 6. FIG. 6 illustrates a cross section of the power seat slide device illustrated in FIG. 5 along VI-VI line. For the sake of convenience, the screw 84 (bolt portion 84a) and the nut 94 fastened to the screw 84 are also illustrated in FIG. 6. As shown in FIG. 6, the lower rail 81 includes a bottom portion 81a, two first side wall portions 81b each of which extends upward from each end of the bottom portion 81a, and two first folded wall portions 81 extend each of which extend inward from each upper end of the first side wall portions 81c, and further extend downward toward base end of the first side wall portion 81b. Further, a resin shoe 96 is attached at each end portion of the first folded wall portions 81c so as to extend within entire length in a longitudinal direction thereof.

On the other hand, the upper rail 82 includes a cover portion 82a, a pair of second side wall portions 82b and a pair of second folded wall portions 82c. Specifically, the second side wall portion 82b extends downward from each end portion in a width direction of the cover portion 82a, and the second folded wall portion 82c extends outward and further extends upward so as to be surrounded by the first side wall portion 81b and the first folded wall portion 81c.

In a manner where the resin shoe 96 is attached to the second folded wall portion 82c of the upper rail 82, the upper rail 82 is supported on the rollers 97 provided between the second folded wall portion 82c and the bottom portion 81a of the lower rail 81. Thus, the upper rail 82 is supported so as to be slidable relative to the lower rail 81 in a manner where the rollers 97 are rotated between the upper rail 82 and the lower rail 81, and the second fold wall portion 82c is guided by the resin shoe 96.

In such configuration, in order to avoid interference with the lower rail 81, the supporting bracket 82 needs to be formed so as to avoid a space for providing, such as the resin shoe 96.

Thus, the supporting bracket 87 engages with a top end surface of the cover portion 82a of the upper rail 82 and with an upper part of a top end surface of the second side wall portion 82b, and the upper rail 82 is not extended downward so as to engage with a lower part of the second side wall portion 82b.

Thus, when an impact load is applied to the upper rail 82 and the supporting bracket 87 (gear box 85), the supporting bracket 87 or the like deforms due to the load intensively applied to the engaging surface (load transmitting surface), which is unevenly distributed at the upper rail 82, as a result, the vehicle seat may be displaced.

Especially, because the supporting bracket 87 (gear box 85) engages with the upper rail 82 at the upper portion thereof relative to the screw shaft 84 that penetrates through the supporting bracket 87, the load is intensively applied the engaging surface (load transmitting surface), and the supporting bracket 87 is bent downward, as a result, the vehicle seat may be displaced.

A need thus exist to provide a power seat slide device for a vehicle that reduces chances of positional displacements of the vehicle seat cause by an impact load.

In this specification, the vertical direction may not mean an accurate vertical direction.

SUMMARY OF THE INVENTION

According to an aspect of the present invention, a power seat slide device for a vehicle includes a first rail fixed on a vehicle floor and including a bottom portion, a pair of first side wall portions and a pair of first folded wall portions, the first side wall portion extending upward from each end in its width direction of the bottom portion, the first folded wall portion extending inward from each upper end of the first side wall portions and further extends downward toward each base end of the first side wall portions, a second rail fixed at a vehicle seat and including a cover portion, a pair of second side wall portions and a pair of second folded wall portions, the second side wall portion extending downward from each end in a width direction of the cover portion, and the second folded wall portion extending outward in a width direction thereof from each lower end of the second side wall portions and further extends upward so as to be surrounded by the first side wall portion and the first folded wall portion, a first rolling body provided between the bottom portion and the second folded wall portion in order to support the second rail so as to be slidable relative to the first rail, a second rolling body provided between the first folded wall portion and the second folded wall portion in order to support the second rail so as to be slidable relative to the second rail, a screw shaft having a shaft center, which extends in a longitudinal direction of the second rail between the second side wall portions at a half height thereof, and engaging with a nut member, which is fixed to the first rail, a gear box fixed to a front end of the second rail and supporting the screw shaft so as to be rotatable in order to transmit rotations from an electric driving source to the screw shaft, the screw shaft rotated relative to the nut member in order to move the second rail so as to slide relative to the first rail, the gear box including a gear housing and a supporting bracket and a plate, the gear housing being sandwiched by the supporting bracket and the plate, the supporting bracket being fixed to a top end of the second rail in a manner where the supporting bracket engages with the top end surface of the second rail, the supporting bracket including a main unit portion and extending portions, the main unit portion engaging with a top end surface of each of the second side wall portions and a top end surface of the cover portion, and each of extending portions extends outward in a width direction thereof from the main unit portion and engaging with a top end surface of the base end portion of each of the second folded wall portions.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention in which the power seat slide device for a vehicle is mounted on a front seat of a vehicle such as an automobile will be explained in accordance with attached drawings. In this embodiment, directions such as a front-rear direction, a rear-left direction and a vertical direction are set relative to the vehicle seat.

Figure 1:
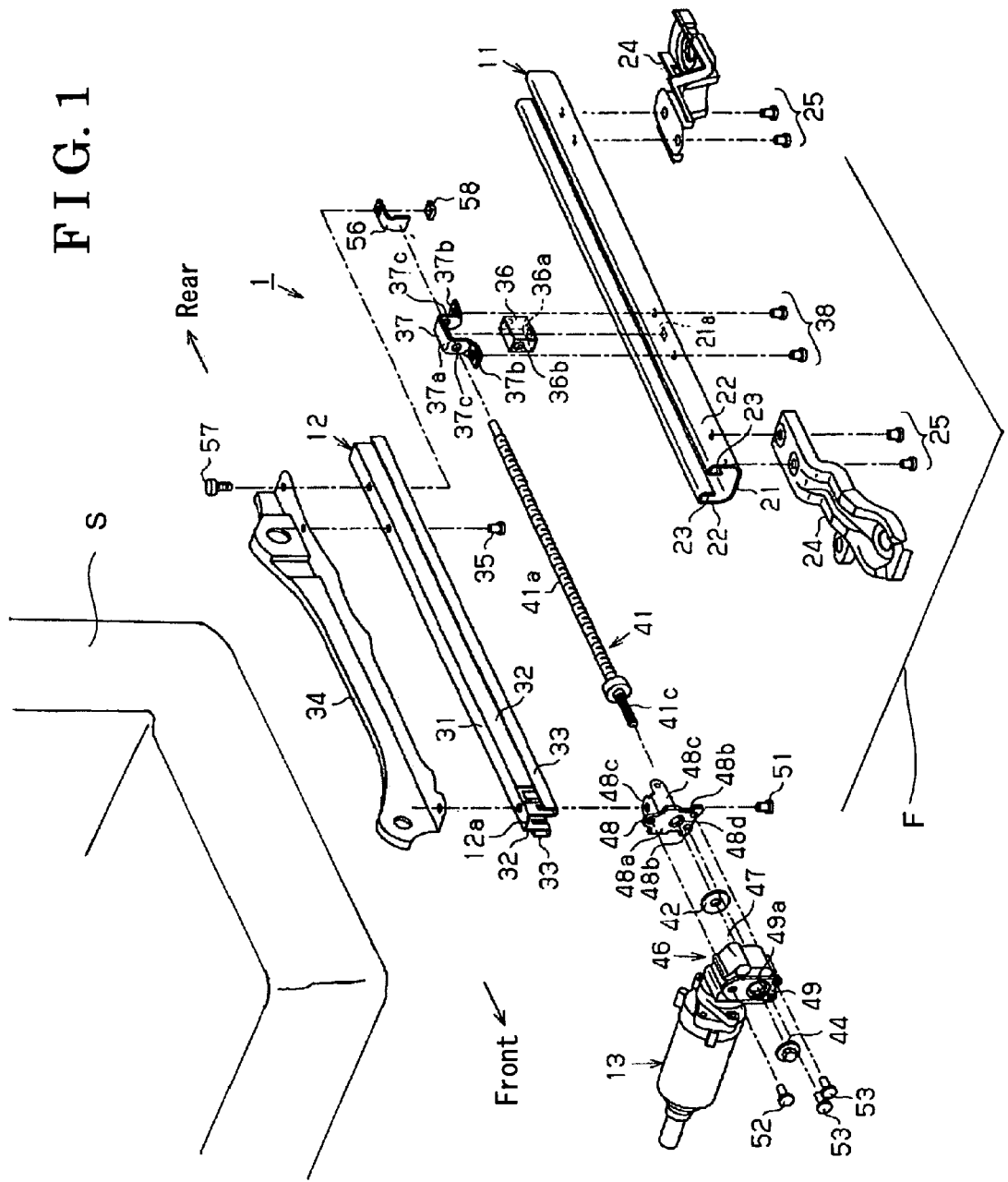
FIG. 1 illustrates an exploded perspective view indicating a power seat slide device 1 of the embodiment.
Figure 2:
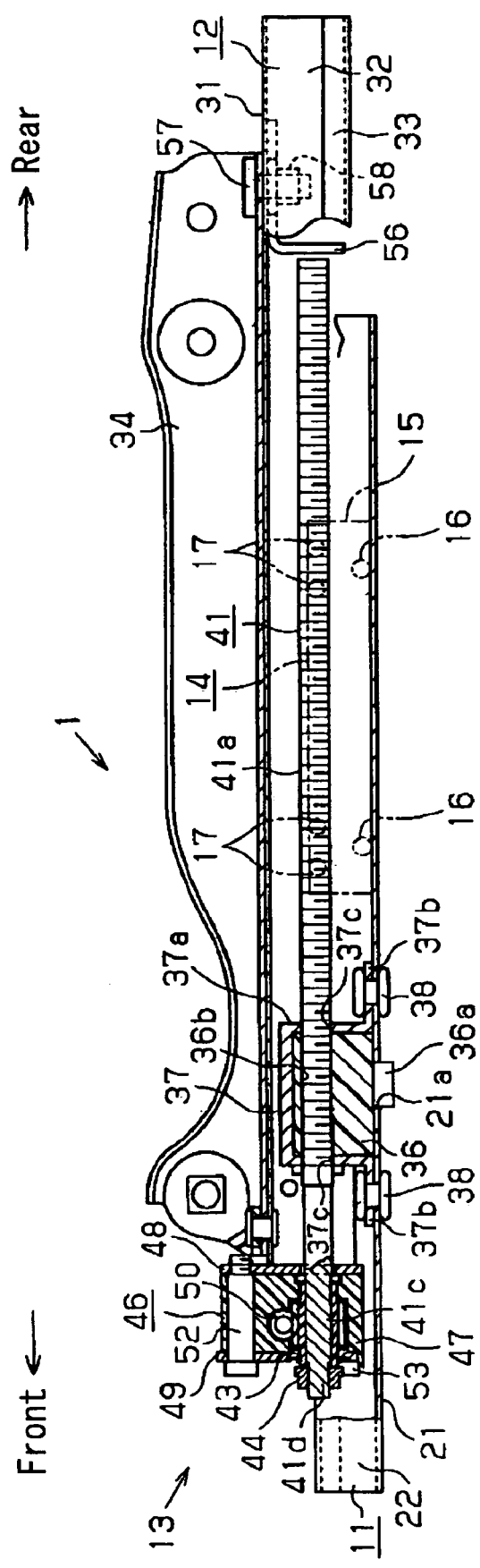
FIG. 2 illustrates a side view indicating a part of the power seat slide device.
Figure 3A:
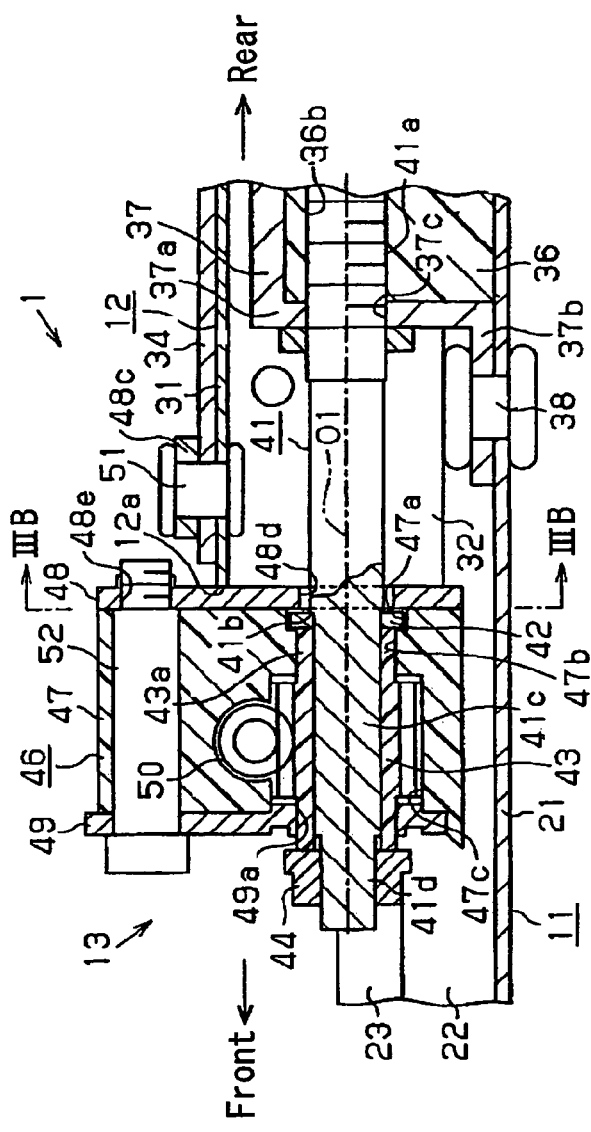
FIG. 3A illustrates a cross section indicating an enlarged power seat slide device illustrated in FIG. 2.
Figure 3B:
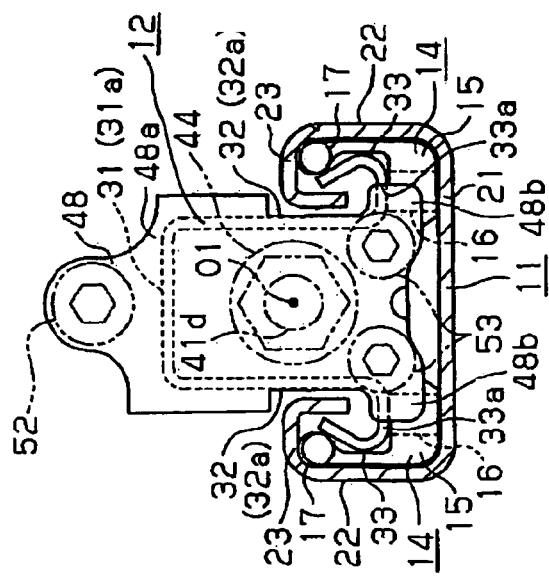
FIG. 3B illustrates a cross section of the power seat slide device illustrated in FIG. 3A along a IIIB-IIIB line.

FIG. 1 illustrates an exploded perspective view indicating a power seat slide device 1 for a vehicle of the embodiment. FIG. 2 illustrates a side view indicating a part of the power seat slide device 1, FIG. 3A illustrates a cross section indicating an enlarged power seat slide device 1 illustrated in FIG. 2, FIG. 3B illustrates a cross section of the power seat slide device 1 illustrated in FIG. 3A along IIIB-IIIB line. As shown these drawings, the power seat slide device 1 mainly includes a lower rail 11 serving as a first rail, an upper rail 12 serving as a second rail and a driving mechanism 13 serving as an electric driving source.

The lower rail 11 formed in a long shape so as to extend in a front-end direction includes a bottom portion 21, a pair of first side wall portions 22 and a pair of first folded wall portions 23. Specifically, the first side wall portion 22 extends from each end in its width direction (right-left direction) of the bottom portion 21 in upward direction, and the first folded wall portion 23 extends inward from each upper end of the first side wall portions 22, and further extends downward toward a base end of the first side wall portion 22.

At each end in its front-rear direction of the lower rail 11, a bracket 24 is attached by means of rivets 25 at the bottom portion 21 of the lower rail 11. The lower rail 11 is fixed to a vehicle floor F by means of these brackets 24 provided at the front end and the rear end of the lower rail 11.

The upper rail 12 formed in a long shape so as to extend in a front-rear direction includes a cover portion 31, a pair of second side wall portions 32 and a pair of second folded wall portion 33. Specifically, the second side wall portion 32 extends down ward from each end in a width direction of the cover portion 31, and the second folded wall portion 33 extends outward in a width direction thereof from each lower end of the second side wall portion 32, and further extends upward so as to be surrounded by the first side wall portion 22 and the first folded wall portion 23.

A bracket 34 is attached at the cover portion 31 of the upper rail 12 by means of a rivet 35. The upper rail 12 is fixed to a vehicle seat S by means of the bracket 34.

As shown in FIG. 3B, the upper rail 12 is supported by the lower rail 11 so as to slide in a front-rear direction relative to the lower rail 11 by means of a pair of sliding members 14, each of which is housed within a space formed between an inner wall surface of the first side wall portions 22 and an outer wall surface of the second folded wall portion 33.

Specifically, each the sliding member 14 includes a holder 15 that is made of resin so as to include an outer wall surface formed in accordance with an inner wall surface of the lower rail 11. Plural rollers 16 formed in a circular cylinder shape and serving as first rolling bodies are rotatably maintained by the holder 15 in a manner where they are positioned between an upper surface of the bottom portion 21 and a lower surface of a base end portion 33a of the second folded wall portion 33.

Further, plural balls 17 serving as second rolling bodies are rotatably maintained by the holder 15 in a manner where they are positioned between an inner wall surface of the first folded wall portion 23 and an outer wall surface of the second folded wall portion 33.

As shown in FIG. 2, the sliding members 14 are provided at rear of the lower rail 11 in order to avoid interference with elements of the driving mechanism 13. Each of the holder 15 holds one roller 16 and two balls 17 at a front end of the lower rail and another one roller 16 and two balls 17 at a rear end of the lower rail.

In this configuration, the upper rail 12 is supported by the lower rail 11 so as to be slidable in a manner where the rollers 16 and the balls 17 are rotated between the upper rail 12 and the lower rail 11, and the holders 15 are guided by the inner wall surface of the lower rail 11.

The driving mechanism 13 is comprised of a nut member 36, a screw shaft 41 and a gear box 46. The nut member 36 is fixed to the bottom portion 21 of the lower rail 11 by means of the rivet 38 together with a bracket 37. In other words, the nut member 36 is formed in an approximately cube shape and includes a protruding portion 36a on a surface that faces the lower rail 11.

Further, at the bottom portion 21 of the lower rail 11, an engage hole 21a, into which the protruding portion 36a of the nut member 36 is engaged, is formed. The bracket 37 includes an engage wall 37a and a flange portions 37b. Specifically, the engage wall 37a, to which the nut member 36 is fitted, is formed in an approximate reversed U-shape, and the flange portion 37b is formed at each end of the engage wall 37a, and one flange portion 37b formed at front extends in a front direction, and the other flange portion 37b formed at rear extend in a rear direction.

The nut member 36 is positioned at and maintained by the lower rail 11 in a manner where its protruding portion 36a is fitted into the engage hole 21a. The nut member 36 is fixed to the lower rail 11 in a manner where each of the flange portions 37 is fastened by the rivet 38.

The nut member 36 includes a screw portion (female screw) 36b that penetrates through the nut member 36 in a front-rear direction thereof. On each of the front and rear walls of the engage wall 37a, a through hole 37c is formed so as to be coaxial to the screw portion 36b.

The screw shaft 41 extends in a longitudinal direction of the upper rail 12 approximately within its entire length so as to penetrate through the bracket 37 (through hole 37c) having an allowance therebetween in a manner where a screw portion (male screw) 41a of the screw shaft 41 engages with the screw portion 36b of the nut member 36. As shown in FIG. 3, the screw shaft 41 includes a shaft center O1 which is set at the screw shaft 41 so as to extend in a longitudinal direction of the upper rail 12 between the second side wall portions 32 at a half height thereof. A front end portion of the screw shaft 41 projects from a front end 12a of the upper rail 12.

As shown in FIG. 3A, at the front end portion of he screw shaft 41, a serrated shaft portion 41c and a bolt portion 41d are formed. Specifically, the serrated shaft portion 41c has a diameter that is smaller than another part of the screw shaft 41 through a step portion 41b, and the bolt portion 41d is formed at the front end of the serrated shaft portion 41c.

The front end portion of the screw shaft 41 penetrates through a washer 42 and a helical gear (worm wheel) 43. The washer 42 is made of metal, and the helical gear (worm wheel) 43 is made of resin and formed so as to serration-engage with the serrated shaft portion 41c. The helical gear 43 is positioned in its axial direction in a manner where it is held between the washer 42 engaged with the step portion 41b and the nut 44 to which the bolt portion 41d is screwed.

One end of the helical gear 43 engaging with the washer 42 forms a shaft portion 43a that is formed in a circular cylinder shape. An external diameter of the washer 42 is set so as to be larger than that of the shaft portion 43a in order to engage with an entire end surface of the helical gear 43 (shaft portion 43a).

The gear box 46 fixed to the front end 12a of the upper rail 12 includes a gear housing 47, a supporting bracket 48 and a plate 49. Specifically, the gear housing 47 is made of resin and held between the supporting bracket 48 and the plate 49, each of which is made of a metal plate.

The gear box 46 houses the helical gear 43 and a worm 50 meshing with the helical gear 43. The worm 50 is provided at the electric motor serving as an electric power source, and the worm 50 and the helical gear 43 configures a reducer. Thus, the drive generated by the electric motor is transmitted to the screw shaft 41 within the gear box 46 by means of the helical gear 43.

As shown in FIG. 3B, the supporting bracket 48 is formed so as to engage with the front end surface of the upper rail 12 with avoiding an interference with the lower rail 11. Specifically, the supporting bracket 48 includes a main unit portion 48a and extending portions 48b. The main unit portion 48a engages with a front end surface 32a (top end surface) of each of the second side wall portions 32 and a front end surface 31a (top end surface) of the cover portion 31, and each of extending portions 48b extends outward at the lower portion of the main unit portion 48a in its width direction and engages with a front end surface (top end surface of the base end portion) of the base end portion of each of the second folded wall portions 33.

On the supporting bracket 48, plural (two) attachment portions 48c and a through hole 48d are formed. The attachment portion 48c extends in the side of the upper rail 12, and the screw shaft 41 penetrates through the through hole 48d as shown in FIG. 1. The supporting bracket 48 engages with the front end surface of the upper rail 12 (the cover portion 31, the second side wall portion 32 and the base end portion 33a) in a manner where the front end portion of the screw shaft 41 penetrates through the through hole 48d, and the supporting bracket is fixed to the upper rail 12 by means of a rivet 51. The step portion 41b of the screw shaft 41 is located at front relative to the supporting bracket 48, and thus, the washer 42 is positioned in an axial direction thereof at front relative to the supporting bracket 48.

Figure 4:
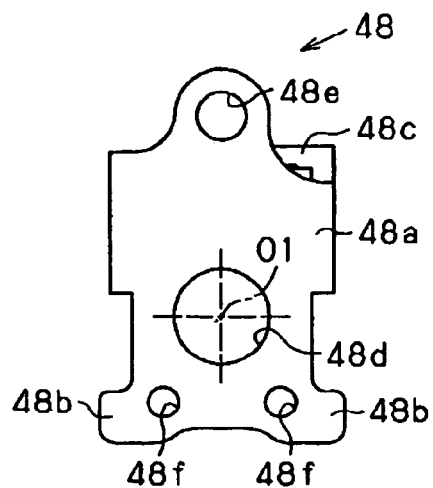
FIG. 4 illustrates a front view indication a supporting bracket.
Figure 5:
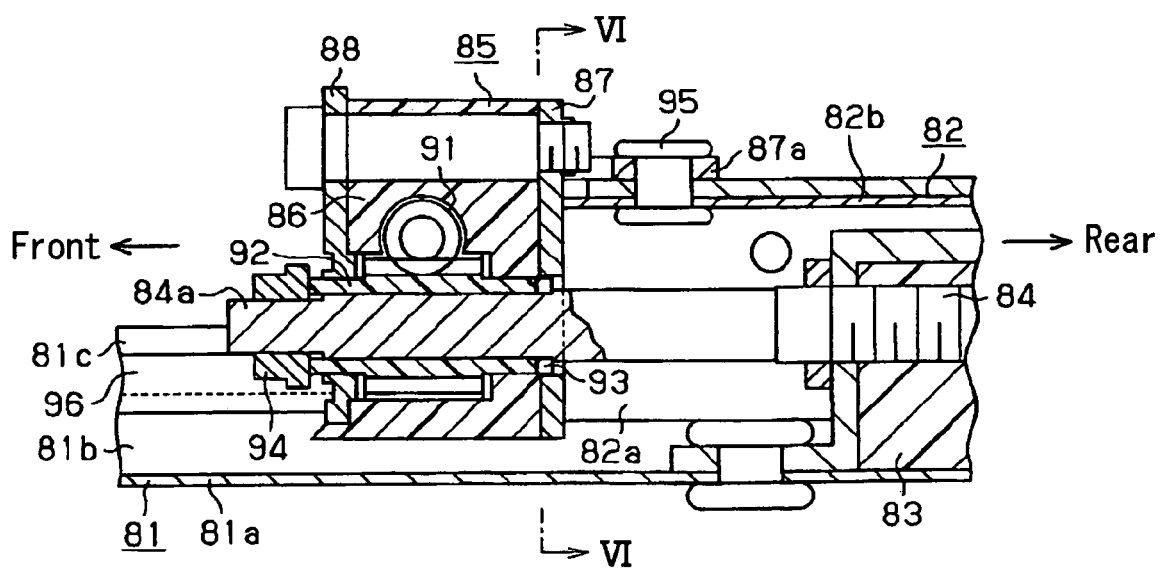
FIG. 5 illustrates a longitudinal sectional view indicating a known power seat slide device.
Figure 6:
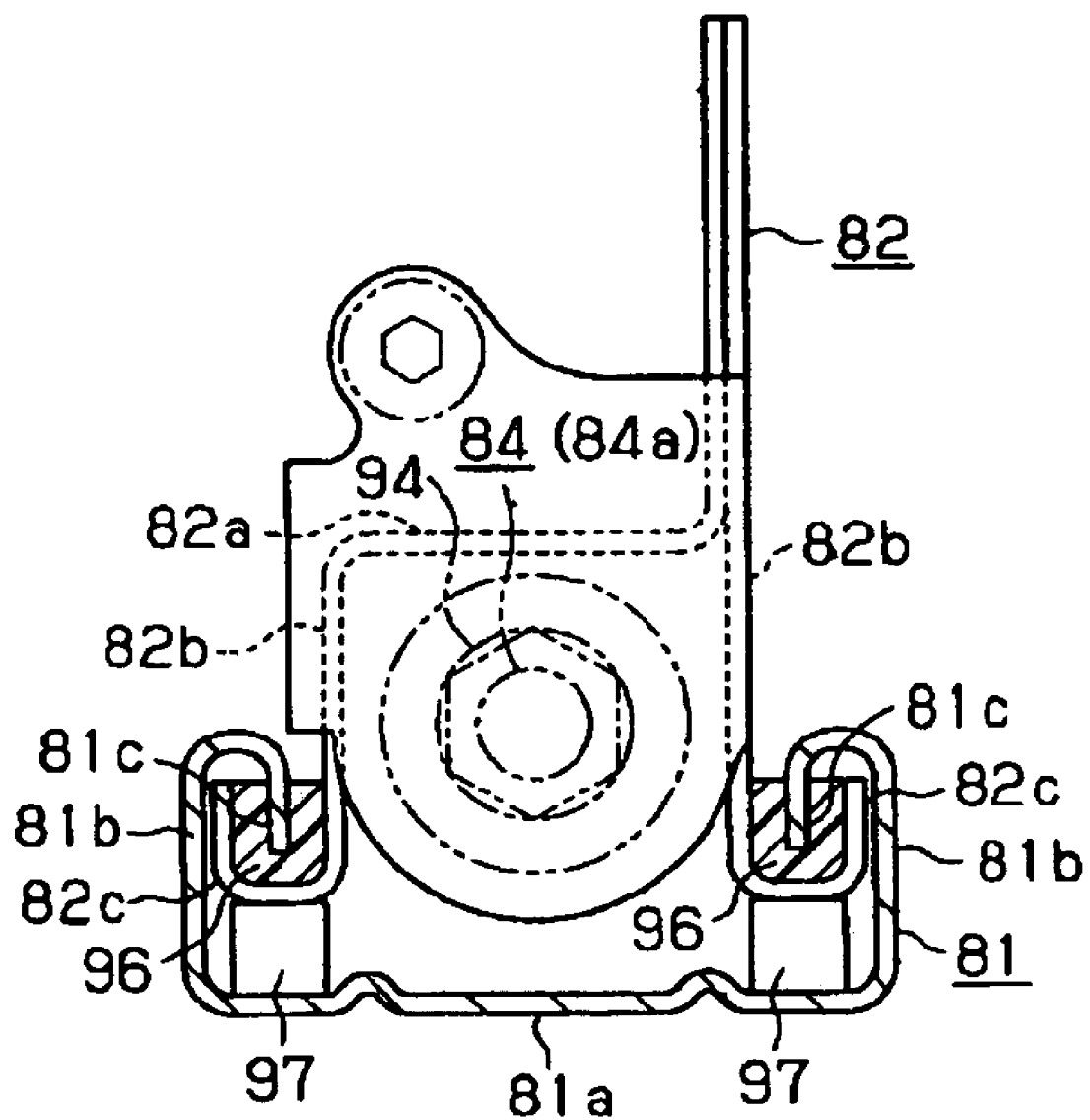
FIG. 6 illustrates a cross section of the known power seat slide device shown in FIG. 5 along a VI-VI line.

Further, as shown in FIG. 4, a nut portion 48e and nut portions 48f are formed on the supporting bracket 48 The nut portion 48e is positioned upper relative to the through hole 48d (shaft center O1), and the nut portion 48f is positioned lower relative to the through hole 48d (shaft center O1).

As shown in FIG. 3A, the gear housing 47 includes a first concave portion 47a, a bearing portion 47b and a second concave portion 47c. Specifically, the first concave portion 47a is formed in a circular ring shape and houses the washer having an allowance, the bearing portion 47b supports the shaft portion 43a so as to be rotatable, and the second concave portion 47c houses the helical gear 43 and the worm 50. The gear housing 47 houses the washer 42 and the helical gear 43 and the like engage with the front end surface of the supporting bracket 48.

A through hole 49a, through which the helical gear 43 attached to the serrated shaft portion 41c penetrates, is formed on the plate 49. The plate 49 engages with the front end surface of the gear housing 47 in a manner where the helical gear 43 penetrates through the through hole 49a.

As shown in FIG. 1, the gear housing 47 is sandwiched by the supporting bracket 48 and the plate 49 in a manner where a screw 52 serving as a fastening member penetrates through the plate 49 and the gear housing 47, and is fastened by the nut portion 48e of the supporting bracket 48, and a pair of screws 53 also serving as fastening members penetrate through the plate 49 and the gear housing 47, and are fastened by the nut portions 48f. As shown in FIG. 3B, the screw 52 is positioned upper relative to the shaft center O1 of the screw shaft 41, and the screws 53 are positioned lower relative to the shaft center O1 of the screw shaft 41.

The shaft portion 43a of the helical gear 43, which is attached to the screw shaft 41 (serrated shaft portion 41c), is supported by the bearing portion 47b of the gear housing 47 so as to be rotatable. In other words, the screw shaft 41 is supported by the gear box 46 (gear housing 47), which is fixed to the front end 12a of the upper rail 12, so as to be rotatable and unmovable in an axial direction thereof.

Because an internal diameter of the through hole 48d is set so as to be smaller than an external diameter of the washer 42 in order to maintain the rigidity of the supporting bracket 48, the washer 42 is assembled to the screw shaft 41 (serrated shaft portion 41c) after the supporting bracket 48 is fixed to the front end 12a of the upper rail 12, and then the gear housing 47 is assembled to the upper rail 12.

While the gear housing 47 and the like is assembled to the upper rail 12, the helical gear 43 penetrated through the through hole 49a formed on the plate 49 with the second concave portion 47c is sandwiched between the washer 42 and the nut 44 that is fastened to the bolt portion 41d.

As shown in FIG. 1 and FIG. 2, at the rear end of the bracket 37 used for fixing the nut member 36 to the lower rail 11, a stopper 56 made of metal so as to be in a reversed L-shape is provided. The stopper 56 is fastened to the upper rail 12 by means of a nut 58 and a bolt 57 screwed into the nut 58.

In this configuration, when the worm 50 is rotated by the electric motor in order to rotate the screw shaft 41 by means of the helical gear 43, the screw shaft 41 is moved in an axial direction thereof relative to the nut member 36 fixed to the lower rail 11, as a result, the upper rail 12 is moved so as to slide on the lower rail 11 in order to adjust the position of the vehicle seat S relative to the vehicle floor F. When the rotation of the screw shaft 41 is stopped, because the screw shaft 41 is screwed into the nut member 36, the screw shaft 41 is regulated so as not to move in an axial direction thereof, as a result, the upper rail 12 is regulated so as not to slide on the lower rail 11 in order to maintain the vehicle seat S at a predetermined position relative to the vehicle floor F.

In the embodiment, the upper rail 12 is supported so as to be slidable relative to the lower rail 11 by means of the rollers 16 (serving as the sliding member) provided between the bottom portion 21 and the second folded wall portions 33, and the balls 17 (serving as the sliding member) provided between the first folded wall portions 23 and the second folded wall portions 33.

In other words, the upper rail 12 is supported by the rollers 16 and the balls 17 partially provided at the upper rails 12 in a longitudinal direction of the upper rail 12 so as to be slidable relative to the lower rail 11.

Thus, the supporting bracket 48 does not need to be formed as described in the known seat slide device.

Further, the supporting bracket 48 includes the main unit portion 48a engaging with the front end surface 31a of the cover portion 31 and the extending portion 48b engaging with the front end surface of the base end portion 33a of the second folded wall portion 33. Thus, the supporting bracket 48 engages with approximately entire area of the front end surface of the upper rail 12.

In this configuration, even when an impact load is applied to the upper rail 12 and the supporting bracket 48 (gear box 46) in a front-rear direction (an longitudinal direction of the upper rail 12), because the load is dispersed within entire engaging surface of the upper rail 12, chances that the supporting bracket 48, the nut 44, the helical gear 43 and the like deform can be reduced, as a result, chances of a displacement of the vehicle seat can be reduced.

Especially, because the screw shaft 41 includes the shaft center O1 which is set at the screw shaft 41 so as to extend in a longitudinal direction of the upper rail 12 between the second side wall portions 32 at a half height thereof, the supporting bracket 48 (gear box 46) engages with the front end surface of the upper rail 12 at both upper and lower portions of the screw shaft 41.

Thus, even when the impact load is applied to the upper rail 12 and the supporting bracket 48 (gear box 46), because moments on the basis of the impact load act in a manner where they set off each other relative to the screw shaft 41 (shaft center O1), chances that the supporting bracket 48 bent in the upward direction or the downward direction can be reduced, as a result, chances that the vehicle seat is displaced dues to the bent can be reduced.

Further, because the amount of the displacement in accordance with the bending angle of the supporting bracket 48 is dispersed in the upward and downward directions on the basis of the screw shaft 41 (shaft center O1), the amount of the displacement is reduced.

In the embodiment, the gear housing 47 is held between the supporting bracket 48 and the plate 49 by means of the screw 52 provided at the upper portion relative to the shaft center O1 of the screw shaft 41 and the screws 53 provided at the lower portion relative to the shaft center O1 of the screw shaft 41.

Thus, because the gear box 46 is integrally fixed to the screw shaft 41 at the upper portion and the lower portion relative to the shaft center O1. Chances that the supporting bracket 48 deform due to the impact load can be reduced, as a result, chances that the vehicle seat is displaced can be reduced.

The shape of the lower rail 11 in its cross section and the shape of the upper rail 12 in its cross section may be changed. The first side wall portion 22, the first folded wall portion 23, the second side wall portion 32 and the second folded wall portion 33 may be tilted or bent if necessary. The lower rail 11 and the upper rail 12 may be formed by joining plural members.

The rollers 16 and the balls 17 serving as the sliding member 14 may not be provided so as to be integral at the holders, and they are provide independently. The number of the roller 16 and the ball 17 may be changed.

The configuration related to the transition of the rotation from the electric motor to the screw shaft 41 may not be limited to the reducer configured by the worm 50 and the helical gear 43.

The positions of the screws 52 and 53 relative to the shaft center O1 and the number of the screws 52 and 53 may be changed.

The gear box 46 may be fixed to the rear end of the upper rail 12. The sliding direction of the seat caused by the sliding movement of the upper rail 12 relative to the lower rail 11 in the embodiment is a front-rear direction of the vehicle seat, however, the vehicle seat may be moved in a front-rear or a width direction of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A power seat slide device for a vehicle comprising:
   a first rail fixed on a vehicle floor and including a bottom portion, a pair of first side wall portions and a pair of first folded wall portions, the first side wall portion extending upward from each end in its width direction of the bottom portion, the first folded wall portion extending inward from each upper end of the first side wall portions and further extends downward toward each base end of the first side wall portions;
   a second rail fixed at a vehicle seat and including a cover portion, a pair of second side wall portions and a pair of second folded wall portions, the second side wall portion extending downward from each end in a width direction of the cover portion, and the second folded wall portion extending outward in a width direction thereof from each lower end of the second side wall portions and further extends upward so as to be surrounded by the first side wall portion and the first folded wall portion;
   a first rolling body provided between the bottom portion and the second folded wall portion in order to support the second rail so as to be slidable relative to the first rail;
   a second rolling body provided between the first folded wall portion and the second folded wall portion in order to support the second rail so as to be slidable relative to the first rail;
   a screw shaft having a shaft center, which extends in a longitudinal direction of the second rail between the second side wall portions at a half height thereof, and engaging with a nut member, which is fixed to the first rail;
   a gear box fixed to a front end of the second rail and supporting the screw shaft so as to be rotatable in order to transmit rotations from an electric driving source to the screw shaft;
   the screw shaft rotated relative to the nut member in order to move the second rail so as to slide relative to the first rail;
   the gear box including a gear housing and a supporting bracket and a plate, the gear housing being sandwiched by the supporting bracket and the plate, the supporting bracket being fixed to a top end of the second rail in a manner where the supporting bracket engages with the top end surface of the second rail;
   the supporting bracket including a main unit portion and extending portions; the main unit portion engaging with a top end surface of each of the second side wall portions and a top end surface of the cover portion; and
   each of extending portions extends outward in a width direction thereof from the main unit portion and engaging with a top end surface of the base end portion of each of the second folded wall portions.

2. The power seat slide device for a vehicle according to claim 1, wherein the gear housing is sandwiched by the supporting bracket and the plate in a manner where they are fastened by means of plural fastening members that penetrate through the supporting bracket, the gear housing and the plate, and at least one of the fastening members is provided at an upper portion relative to the shaft center of the screw shaft, and at least one of the fastening members is provided at a lower portion relative to the shaft center of the screw shaft.

3. The power seat slide device for a vehicle according to claim 1, wherein the supporting bracket engages with the top end surface of the second rail at an upper portion of the screw shaft and a lower portion of the screw shaft in order to set off moments acting relative to the screw shaft.

4. The power seat slide device for a vehicle according to claim 2, wherein the supporting bracket engages with the top end surface of the second rail at an upper portion of the screw shaft and a lower portion of the screw shaft in order to set off moments acting relative to the screw shaft.

5. The power seat slide device for a vehicle according to claim 1, wherein a sliding member, which is provided between the bottom portion and the second folded wall portion and between the first folded wall portion and the second folded wall portion in order maintain the first rolling body and the second rolling body, is provided at rear of the first rail.

6. The power seat slide device for a vehicle according to claim 2, wherein a sliding member, which is provided between the bottom portion and the second folded wall portion and between the first folded wall portion and the second folded wall portion in order maintain the first rolling body and the second rolling body, is provided at rear of the first rail.

7. The power seat slide device for a vehicle according to claim 1, wherein an internal diameter of a through hole formed on the supporting bracket through which the screw shaft penetrates is set so as to be smaller than an external diameter of a washer used for positioning a helical gear of the gear box.

8. The power seat slide device for a vehicle according to claim 2, wherein an internal diameter of a through hole formed on the supporting bracket through which the screw shaft penetrates is set so as to be smaller than an external diameter of a washer used for positioning a helical gear of the gear box.

9. The power seat slide device for a vehicle according to claim 1, wherein a stopper made of metal so as to be in a reversed L-shape is provided at a rear end of a bracket used for fixing the nut member to the first rail.

10. The power seat slide device for a vehicle according to claim 2, wherein a stopper made of metal so as to be in a reversed L-shape is provided at a rear end of a bracket used for fixing the nut member to the first rail.

* * * * *